United States Patent [19]

Sternberg et al.

[11] 4,222,870

[45] Sep. 16, 1980

[54] ULTRAFILTRATION APPARATUS AND METHOD

[75] Inventors: Shmuel Sternberg, Lexington; Steven S. Emmer, Newton, both of Mass.

[73] Assignee: Millipore Corporation, Bedford, Mass.

[21] Appl. No.: 880,950

[22] Filed: Feb. 24, 1978

[51] Int. Cl.² .............................................. B01D 13/00
[52] U.S. Cl. ....................... 210/639; 210/94; 210/101; 210/650; 210/257.2; 210/321 R; 210/444; 210/483; 210/490; 210/DIG. 24; 422/101; 422/256
[58] Field of Search ...................... 210/23 H, 23 F, 74, 210/85, 86, 94, 96 M, 101, 248, 256, 257 M, 258, 321 R, 433 M, 443, 444, 463, 483, 490, 497, 21, 511, DIG. 24; 23/259, 272.6 R, 272 AH, 272.7; 215/DIG. 3, 6; 222/108; 422/101, 256

[56] References Cited

U.S. PATENT DOCUMENTS

| 195,423 | 9/1877 | Vent | 210/460 |
|---|---|---|---|
| 1,043,455 | 11/1912 | Neil | 210/406 |
| 1,435,972 | 11/1922 | Olsson | 210/406 |
| 2,438,906 | 4/1948 | Elsas et al. | 215/6 |
| 3,389,078 | 6/1968 | Elzinga et al. | 210/21 X |
| 3,488,768 | 1/1970 | Rigopulos | 210/DIG. 24 |
| 3,494,470 | 2/1970 | Banfield | 210/321 R |
| 3,591,493 | 7/1971 | Zeineh | 210/22 |
| 3,630,360 | 11/1971 | Davis et al. | 210/82 |
| 3,661,774 | 5/1972 | Masologites | 210/21 |
| 3,820,661 | 6/1974 | Pages | 210/321 |

OTHER PUBLICATIONS

New Separation Technique for the CPI, Michaels, CEP, vol. 64, No. 12, pp. 31-43.
Millipore Prod. Info. Bull, "Molecular Filtration", Cat. No. LAR8010(P) Millipore Corp. pp. 8-9, 18-19, 30-36.

Primary Examiner—Ferris H. Lander
Attorney, Agent, or Firm—Irons and Sears

[57] ABSTRACT

Method and apparatus for the constant volume solvent exchange or constant volume neutralization of a liquid solution or suspension of macromolecules. Liquid enters a bulk zone and passes into a thin layer filtration zone, in which the separation is effected through a semipermeable membrane filter.

16 Claims, 2 Drawing Figures

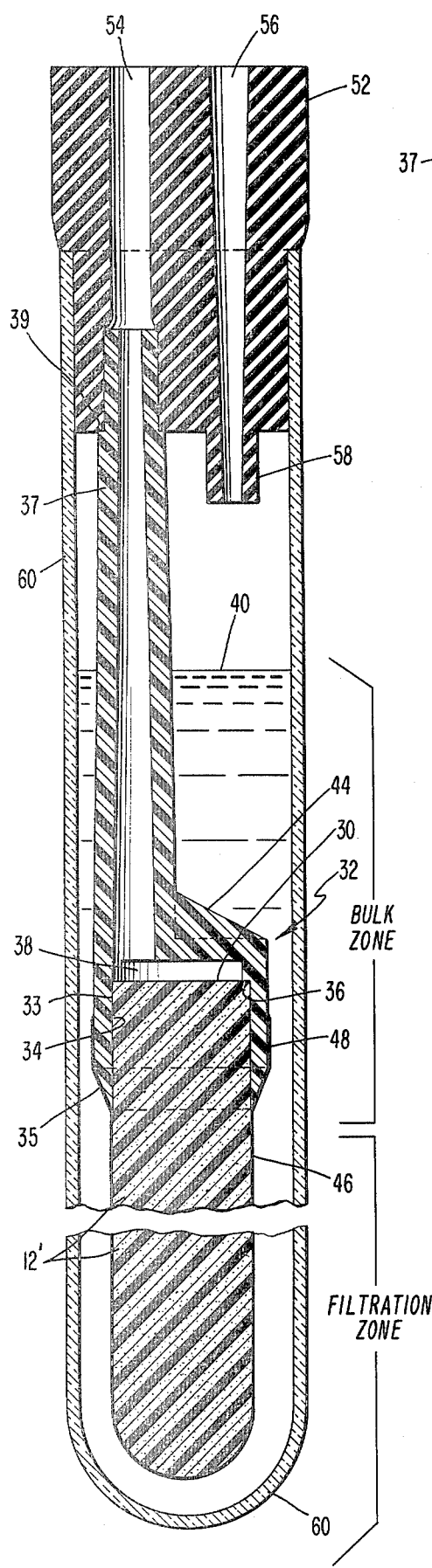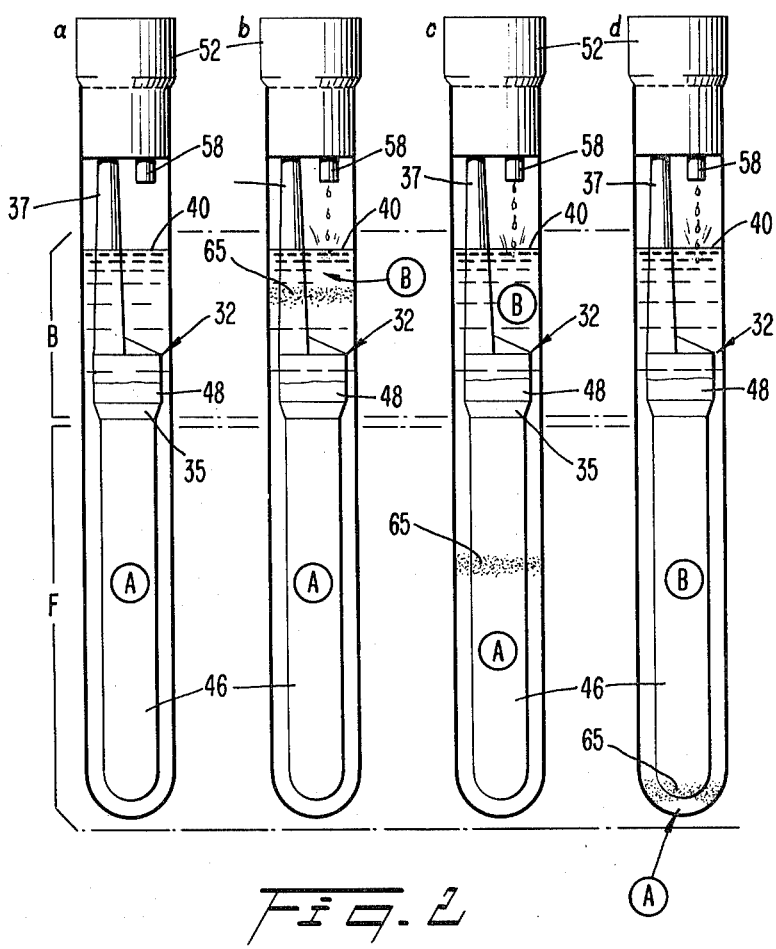

ULTRAFILTRATION APPARATUS AND METHOD

BACKGROUND OF THE INVENTION

The present invention concerns an apparatus and method for changing the solvent environment of a solution containing macromolecules. The apparatus and method are useful in a variety of preparative and analytical procedures involving macromolecules in solution or in suspension, and suspended macromolecular aggregates. The necessity for such a method arises whenever it is desired to change the solvent composition, pH or ionic strength, or whenever it is desired to separate the macromolecules in solution or suspension from low molecular weight substances.

A variety of methods for exchanging one solvent or suspending medium for another are well known to those skilled in the art. With the exception of specific methods exploiting the chemical properties of specific macromolecular species, those methods generally applicable to macromolecular solutions and suspensions all exploit the difference in size between the macromolecules and the molecules of the solvent. Most commonly, a solvent or suspension medium is composed of one or more substances having molecular weights less than 1000 while the macromolecules are generally substances having molecular weights greater than 1000, although the distinction is arbitrary. The important factors are not the absolute molecular weights, but the differences in molecular weight and molecular size between the molecules of the medium and the macromolecules. For example, most of the described prior art methods, and the method of the present invention could, in principle, be used to separate two macromolecular species from each other, provided there was a sufficiently large molecular size difference between the two species.

Dialysis is the name given to processes based upon diffusion of molecules through a semi-permeable membrane. A membrane is chosen which is permeable to the small molecules of the medium but impermeable to the macromolecules. The exchange of molecules of the original medium, medium A, with molecules of the desired new medium, medium B, through the membrane, occurs by diffusion. Consequently, the process is slow. At equilibrium, the fraction of medium A remaining with the macromolecular sample will equal the relative volumes of the macromolecular sample and the volume of medium B to which it is exposed. For example, if one volume of macromolecule sample containing medium A is dialyzed against nine volumes of medium B, the concentration of medium A in the sample will be reduced to not less than one-tenth, under ideal conditions, at equilibrium. Alternatively, the macromolecular sample may be dialyzed against several changes of smaller volumes of medium B, to achieve the desired result. The process consumes large amounts of medium B, which can only be partially conserved at the cost of greatly increasing the number of manipulative steps. Additional limitations on the dialysis method include the fact that the method does not work well where there are interactions between medium A and medium B such as the formation of a precipitate, which could interfere with the process. In addition, certain substances interact with the dialysis membranes commonly used, such that they fail to diffuse freely through the membrane.

Gel filtration employs granules of cross-linked polymer having a porous or spongy structure. The structure of the granules is controlled such that molecules of the medium can diffuse within the granules but molecules greater than a certain size limit are excluded. In a typical gel filtration process, a column of the polymer beads is constructed, equilibrated with medium B, and the macromolecular sample in medium A is applied to the column and eluted with medium B. Since the molecules of medium A are able to penetrate the interior of the polymer granules, they tend to travel more slowly through the column than do the macromolecules, as the column is eluted. The macromolecules are confined to the spaces between the granules, and tend to migrate more rapidly, since they follow a more direct path. Consequently, as the column is eluted, solvent A is impeded and the macromolecules exit the column in medium B. One disadvantage of the procedure is that it generally introduces some dilution of the macromolecules. In addition, the procedure is time consuming and requires complex chromatography equipment, including fraction collecting equipment and means for assaying the peak fractions containing the macromolecules.

Other chromatographic methods have been employed to effect changes of medium. Macromolecules applied to the column in medium A are eluted with medium B. Such methods are applicable only under certain circumstances. The desired macromolecule must be adsorbed or otherwise retained on the column in medium A and released from the column by medium B. The proper conditions must be determined empirically and are not usually applicable from one macromolecular species to the next. The above-cited disadvantages for gel filtration chromatography are applicable to other chromatographic methods, namely dilution of the sample and need for expensive equipment. In addition, chromatographic methods are often time consuming.

Various specific methods exploiting properties of specific macromolecules are also known. For example, nucleic acids may be precipitated from medium A by the addition of ethanol, and the precipitate may then be redissolved in medium B. Such methods, by their very nature, are only useful in specialized circumstances, and care must be taken to insure that biological activity is retained if desired and that recovery of the macromolecules is quantitative.

Membrane filtration is a term applied to a variety of methods using a selectively permeable membrane in combination with a pressure differential across the membrane. All of the molecules which can pass through the membrane will tend to travel from the high pressure side to the low pressure side of the membrane. For example, a solution containing macromolecules can be concentrated with respect to its macromolecule content by the removal of solvent molecules through a membrane filter such that the fluid volume is reduced while the total mass of macromolecules remains the same. An exchange of media can be effected by employing a concentration step for the removal of solvent A, followed by redilution with solvent B. As a practical matter, the concentration factor of a single step is limited, and complete exchange of media requires several cycles of concentration and redilution. The limitation on concentration is due in part to the accumulation of concentrated macromolecules at the membrane surface resulting in the formation of a macromolecular gel which restricts further flow of material through the membrane. The phenomenon is referred to as concentration polarization and may be counteracted to some extent by the application of stirring at the surface of the membrane. Concentration polarization can also be reduced by causing flow of the solution in a direction parallel or tangential to the membrane surface.

Apparatus for producing tangential flow typically consists of convoluted tubular or lamellar structures through which the solution to be concentrated is required to flow. For a description of concentration polarization and methods for reducing it, see Millipore Product Information Bulletin, "Molecular Filtration", Cat. No. LAR 8010/P, Millipore Corp., Bedford, Mass. 01730. An apparatus exploiting the principle of tangential flow during membrane filtration is disclosed in U.S. Pat. No. 3,591,493, issued July 6, 1971 to Zeineh, and U.S. Pat. No. 3,820,661, issued June 28, 1974 to Pages. In order to effect a replacement of medium A with medium B in such an apparatus, it would be necessary for the macromolecule solution to leave its original container, pass through a series of tubes into the concentrating apparatus and then be rinsed out of the concentrating apparatus into a new container. The replacement of medium would require two steps, first a concentration step, then a dilution step with medium B. The necessity of transferring the sample from its original container and conducting it through the concentrating apparatus with concomitant exposure to a large surface area of membrane filter necessarily reduces the efficiency of sample recovery and limits the method to samples sufficiently large to fill the apparatus. In addition, apparatus of this type is often expensive to buy and difficult to maintain.

Immersible filters have been employed for a variety of purposes, using a variety of designs in the prior art. Immersible filters generally are constructed with the filter element enclosing an interior space. The interior communicates with the filtrate reservoir by means of a tube which may also function as a passageway for backwashing the filter, in some embodiments. U.S. Pat. No. 195,423, issued Sept. 18, 1877 to Vent, discloses a cylindrical or spherical immersible filter having an internal space which may be connected to vacuum. The patent further discloses a filter conforming approximately to the shape of the vessel containing it, in order to provide maximum filter surface area relative to the volume of fluid to be filtered. The filter shape is chosen so as to provide a structure which may be oscillated around pivot points connected to oscillating means outside the container.

The use of an immersible filter in order to maintain a constant volume in the vessel containing the liquid to be filtered is disclosed in U.S. Pat. No. 1,043,455, issued Nov. 5, 1912 to Neil. Suction is applied to the interior of the filter to withdraw liquid from the reservoir through the filter and means are provided for introducing additional liquid to be filtered at approximately the same rate.

U.S. Pat. No. 1,435,972, issued Nov. 21, 1922 to Olsson, discloses the use of vacuum filtration with an immersed filter element, for use in a process of purifying oil.

U.S. Pat. No. 3,630,360, issued Dec. 28, 1971 to Davis, et al. discloses a method of filtering fine particles from liquids by applying a slight vacuum to the interior of an immersed filter thereby drawing off the liquid. The filter element is inverted to reduce filter clogging by gravitational settling of the particles, and to facilitate backwashing.

SUMMARY OF THE INVENTION

The present invention is a method and apparatus for replacing the solvent medium or suspending medium of a solution or suspension of macromolecules, medium A, with a medium of different composition, medium B. A cartridge filter of defined shape, having a semi-permeable membrane over its outer surface, supported by a porous core, having an outlet tube connected to the porous core at one end and an essentially hemispherical shape at the other end is inserted into a test tube containing the macromolecules suspended or dissolved in the first medium, medium A. The relative sizes of the tube and cartridge are chosen such that the cartridge fits the tube with a close tolerance sufficient to allow a thin layer of solution to flow between the wall and bottom of the tube and the cartridge. A portion of the solution is contained in the tube above the region occupied by the filter cartridge, which is termed the bulk zone. A portion of solution in the tube region occupied by the filter is termed the filtration zone. The top opening of the tube is sealed with an inlet port opening above the level of the fluid in the tube and an outlet port through which passes the tube connected to the interior of the cartridge. The outlet port is connected to a vacuum source. The medium A is replaced by medium B by admitting medium B to the bulk zone while simultaneously removing medium A by vacuum filtration through the membrane filter in the filtration zone. Maximum replacement efficiency is achieved by providing that medium A shall be more dense than medium B. The inlet port is so devised that medium B may be added gently to form a layer on top of medium A. Since the system is closed, medium B is added in the bulk zone at the same rate as medium A is drawn off through the cartridge filter in the filtration zone. The interface between the two travels steadily down the tube until medium B replaces medium A.

By means of this method and apparatus, a rapid and efficient exchange of medium can be carried out such that macromolecules are recovered in high yield, in the same volume or a smaller volume if desired, in the new medium. The macromolecules remain in the same vessel, a factor in achieving high recovery and reducing contamination in the event that toxic substances or radioactive materials are present. The apparatus is simple and inexpensive, easy to set up and use.

Although macromolecules are locally concentrated during the process, the apparatus and method provides the unexpected advantage that clogging of the membrane by concentration polarization is not a problem.

The apparatus can also be used to carry out a constant volume neutralization or similar process wherein a desired end point condition is achieved by addition of a solution component, simultaneously with removal of an equal volume of the original medium, until the desired condition is obtained.

BRIEF DESCRIPTION OF DRAWINGS

FIG. 1 is a cross-section in a vertical plane of a preferred embodiment of the device.

FIG. 2 represents schematically four different stages of the course of a constant volume medium exchange process, using the device shown in FIG. 1.

DETAILED DESCRIPTION OF THE DRAWINGS

In FIG. 1, a preferred embodiment of the apparatus of the present invention includes a disposable plastic test tube 60 plugged with a rubber stopper 52 having an outlet port 54 and an inlet port 56, the latter having an extension 58 whose function is to provide a freely falling drop of inlet medium. An immersible filter having a central support of sintered polyethylene 12' shaped so as to be essentially congruent with the test tube 60 is covered on its outer surface by a continuous layer of semi-permeable filter material 46. The filter is connected to the outlet 54 of stopper 52 by a connector 32. The lower end of the connector 32 has an expanded cylindrical portion 33 having a tapered outer surface 35 and a straight-sided inner surface 34 of sufficient diameter to fit tightly over the filter core 12'. The filter core 12' is inserted into the cap 33 as far as it will go. A shoulder 36 on the interior surface of the cap 33 limits the distance the filter core 12' can be inserted, so that a space 38 is provided above the filter core 12; which space communicates with a tube 37 fitted into the outlet 54 of stopper 52. The tube 57 is provided with a shoulder 39 designed to seat against the stopper 52 so that when properly inserted, the immersible filter will be positioned the proper distance from the bottom of the tube 60. Since outlet 54 is off-center from the axis of the tube 60, the connecting outlet tube 37 is similarily off-center, with respect to the cap 33 and filter. In this way, the outlet tube 37 can be offset with respect to the axis of the tube 60 but the filter core 12' is essentially co-axial with tube 60. A buttress 44 is provided for structural rigidity and serves also as a convenient alignment feature. When buttress 44 is aligned parallel to a line joining the centers of inlet 56 and outlet 54, the filter core 12' will be positioned essentially co-axially to tube 60. The approximate level of liquid contained in the tube during operation of the device is shown by the meniscus 40. The apparatus divides the liquid into two functional zones, a filtration zone and a bulk zone, as shown.

FIG. 2 shows four stages of a constant volume medium exchange using the apparatus of the preferred embodiment. Initially, macromolecules are present in medium A as indicated in part (a) of FIG. 2. For reference, that portion of the liquid lying above the level where filtration occurs is denoted by a bracket labeled B, signifying the bulk zone, while the filtration zone itself is denoted by a bracket labeled F. In part (b) of the FIG. 2, the constant volume medium exchange has been initiated. The outlet tube 37 has been connected to vacuum (not shown) and the inlet has been connected to a reservoir of medium Ⓑ (not shown). Medium Ⓐ is drawn through the semi-permeable membrane filter 46 and thence through outlet tube 37. Medium B is drawn from the medium reservoir through the inlet, forming droplets on the end of nipple 58. Droplets of medium B splash onto the liquid surface 40. Medium B is shown as less dense than medium A, forming a layer of medium B overlying medium A in the bulk zone. Medium B, denoted by B in the figure, is separated by an interface zone 65 from medium A, denoted A . In part (c) of FIG. 2, additional medium A has been withdrawn through the filter 46, additional medium B has been added and the interface zone, maintained by the density differential between the two, has moved downward in the tube. Since the interface zone has now entered the filtration zone, F, both medium A and medium B will be drawn through the filter. The rate of downward travel of the interface zone 65 becomes progressively slower, being proportional to the proportion of filter surface exposed to medium A. In part (d) of FIG. 2, virtually all of medium A has been removed and replaced by medium B.

DETAILED DESCRIPTION OF THE INVENTION

The present invention relates to an apparatus and method for treating macromolecules, in a liquid solvent or suspending medium, wherein the medium composition is altered while retaining the macromolecules in a substantially constant volume. A semi-permeable membrane filtration means is employed, capable of preventing the passage of molecules above a certain size while permitting the passage of smaller molecules and ions. The solution or suspension is considered as having two general functional component types, depending on the properties of the semi-permeable membrane filter: macromolecules, which cannot pass through the filter, and the medium, which includes smaller molecules capable of passing through the filter. The medium may comprise a mixture of smaller molecules, the combination of which confers specific properties upon the solution or suspension, including for example pH, ionic strength, and density.

Two related general processes are disclosed, together with apparatus designed for carrying out either, or both in sequence. One process is termed a constant volume medium exchange, the other is termed a neutralization. In essence, the former process involves replacement of one medium with another of differing composition. The latter involves the addition of medium components to the initially present medium in order to affect some solution property such as, for example, pH, ionic strength or density. Both processes involve the removal of part or all of the initially present medium simultaneously with the addition of new medium. In the former the purpose is to effect a change of composition of the macromolecule medium within predetermined tolerance limits. In the latter, the purpose is to effect a change in some physical or chemical property of the medium.

The replacement of one medium by another is accomplished in an apparatus having the semi-permeable filtration means immersed in the solution or suspension, dividing the liquid into two functional zones, a bulk zone and a filtration zone. The bulk zone comprises that portion of the liquid volume which stands above the level of the filter surface. Optimal design of the apparatus is achieved by maximizing the surface area of the filter exposed in the filtration zone while minimizing the volume of liquid contained in the filtration zone. The limit of replacement efficiency is determined in part by the ratio of volumes between the bulk zone and the filtration zone.

The shape of the container is not critical, however certain restrictions on the shape are desirable in order to optimize performance. Preferably, medium A is kept separate from medium B by a density difference between the two media and the efficiency of the replacement is maximized by maintaining as sharp a boundary between the two media as possible. Generally, this may be accomplished by minimizing the cross-sectional area of the density boundary. The shape of the bulk solution zone is therefore preferably cylindrical such that the height of the liquid column is greater than the diameter of the cylinder. If an immersible filter is employed, it is desirable that the shape of the filter be of congruent shape to that portion of the container vessel in which it is to be placed, in order to create a filtration zone of minimum volume. The shape of the container must be such that a filter of congruent shape may be readily inserted and removed. As a consequence of these constraints, it is preferred to use a cylindrical container such as a test tube, together with a cylindrical immersible filter of such dimensions that the filter fits snugly into the tube and conforms to its contours without touching the walls. The cylindrical filter preferably has a rounded end conforming to the rounded bottom of the preferred test tube. When inserted all the way into the tube, the filter cartridge produces a filtration zone in the thin layer of liquid between the filter and the walls of the container, and a bulk zone in the solution displaced above the cartridge. Preferably, the liquid layer thickness in the filtration zone should be about 1 mm to 3 mm.

Alternatively, replacement by a medium B more dense than medium A can be carried out, since very little mixing occurs in the thin fluid layer of the filtration zone. To maximize efficiency under conditions where B is denser than A, the volume of the liquid in the bulk zone, where mixing does occur, should be kept as small as practical.

The filter itself may be constructed of any porous material capable of sustaining a reasonable flow rate and having the ability to prevent the passage of macromolecules therethrough while permitting the passage of smaller molecules. The filter material must be strong enough to withstand a pressure differential across the filter. In order to prevent rupture of the filter, a rigid support may be provided. Where the filter is designed for immersion, a filter cartridge composed of a rigid macroporous core and having a semi-permeable membrane skin tightly applied thereto is preferred, such as that described in copending application Ser. No. 846,330. Such a filter is formed by a dip-coating process resulting in an isotropic membrane having a nominal molecular weight exclusion limit of 10,000-20,000. The nominal molecular weight excluded by a membrane is a performance figure indicating that most macromolecules of that molecular weight or greater are excluded, taking account of membrane pore size heterogeneity and macromolecular shape differences.

The porous interior of an immersible filter must be connected to the outside by means of a hollow tube extending from the porous interior of the filter to some convenient exterior point. The outlet tube may be connected to a vacuum source to create a pressure differential across the filter surface. Alternatively, the outlet may be left at atmospheric pressure and a pressure differential applied by the use of positive pressure at the inlet. The tube containing macromolecules may be stoppered, with openings for the inlet and outlet tubes. Use of a stopper creates a closed system within the tube whereby any volume of liquid removed through the filter is replaced by liquid entering the inlet and the volume of the bulk zone remains constant. Although maintaining a constant volume in the bulk zone during the exchange process is a convenient mode of operation, it is by no means essential. Alternative embodiments in which the volume of the bulk zone is nonconstant are entirely within the scope of the present invention.

The immersion filter outlet tube must pass through the semi-permeable skin of the filter surface. A tight seal between the semi-permeable membrane and the outlet tube must exist, in order to insure proper functioning of the filter.

Maximum efficiency of replacement of medium A by medium B is achieved by preventing mixing of the two in the bulk zone. A number of means for maintaining a separation between two liquids is known in the art. A convenient method, preferred herein, is to maintain the separation by providing a density difference such that medium B is less dense than medium A. Where medium B is not less dense than medium A, it will frequently be possible to increase the density of medium A sufficiently by the addition of an inert, density increasing substance, such as sucrose, to maintain the desired density difference. A density difference of as little as 0.005 g/ml can be used to effect the separation although density differences greater than 0.02 g/ml are preferred. In general, the greater the density difference, the more stable will be the interface between the two media and the less mixing will occur. In maintaining a separation between two solutions by density difference, it is desirable to minimize adventitious mixing caused by mechanical agitation or by convection. Mechanical agitation may be reduced by so positioning the inlet port that entering medium flows down the side of the tube rather than forming a free-falling drop which could disturb the interface by splashing. However, satisfactory results are achieved with a free-falling drop provided the liquid level is sufficiently high that the entering drop has only 1 cm to 2 cm of free fall. Other forms of mechanical agitation, such as vibration and jarring can be avoided by proper location of the apparatus in the laboratory. Convection may be prevented by providing that both media have the same temperature and by properly locating the apparatus to avoid uneven heating, or temperature fluctuations. In situations in which it is necessary to carry out the exchange over an extended period of time, it may be desirable to locate the apparatus in a constant temperature room or a temperature control water bath.

Where medium A and medium B are incompatible with each other, as for example where mixing the two results in the formation of a precipitate or evolution of gas, it will often be possible to carry out a replacement of one by the other using the apparatus of the present invention, by interposing a layer of a third medium compatible with both and having an intermediate density. Medium A will be first replaced by the intermediate medium, which is in turn replaced by medium B. The process need not unduly increase the time required to complete the over-all replacement, since the amount of intermediate medium needed will be that sufficient to provide a buffer layer of sufficient thickness to prevent mixing of the two incompatible media.

As medium A is removed through the filter, macromolecules in medium A which cannot pass through the membrane become increasingly concentrated, eventually reaching a limit concentration imposed by the stability of the interface in the filtration zone. Unexpectedly, it has been observed that clogging of the filter by concentration polarization of the macromolecules in the filter zone was greatly reduced compared to conventional molecular filtration techniques. A complete explanation for this phenomenon is not presently known to the inventors. A possible explanation is that the creation of a filtration zone in which the liquid sample is forced to occupy a thin layer which is continually replenished by liquid entering from the bulk zone causes a flow of liquid parallel to the membrane surface, similar to tangential flow which is known to prevent the buildup of macromolecular gels during ultrafiltration.

If the above explanation is correct, alternative designs for the apparatus of the invention can be constructed wherein the liquid in the filtration zone is constrained to occupy a thin layer over the filter surface. For example, a tube having a semi-permeable membrane forming the flat bottom of a tube may be used to practice the present invention provided an impermeable baffle plate is located just above the membrane surface such that a filtration zone comprising a thin layer of fluid between the filter and the baffle is formed, and fluid from the bulk zone must enter the filtration zone by passing around the edges of the baffle plate. Other equivalent embodiments could be devised, within the scope of the invention.

The apparatus of the present invention can also be employed for the purpose of carrying out a constant volume process wherein a second substance is added to the initial solution, to produce a desired change in a physical parameter such as pH, ionic strength or optical density, for example. Such a process is conveniently illustrated by reference to a neutralization reaction, but the principles and practice of the method and use of the apparatus are applicable to any such reaction characterized by having a measurable end point property attainable by mixing a second substance into the initial solution. The added substance is preferably in solution. In such an application, rapid and uniform distribution of the added substance is desirable, in order to minimize the volume of substance which must be added and the time needed to carry out the process. The process is optimized by providing that the added substance solution be more dense than the initial solution, and that the added solution be introduced in a manner which will maximize its radial dispersion in the tube. The latter result is accomplished by providing an apparatus configuration which permits the incoming drop to land near the axis of the tube. As shown in FIG. 1, the outlet tube is offset from the axis of the tube and the stopper is provided with a nipple at the lower end to insure that the incoming solution droplets fall freely onto the surface of the initial solution rather than sliding down the side of the tube. It has been found that maximal radial dispersion occurs when incoming solution droplets are allowed to fall freely from the inlet and impact on the liquid surface of the bulk zone.

Apparatus can be designed to function optimally for both processes. The preferred embodiment is so designed. The use of a freely falling droplet of incoming solution, which is advantageous for neutralizations, is also satisfactory for a medium exchange process where medium B is less dense than medium A, provided the distance from the inlet to the liquid surface is kept relatively short.

During the course of both constant volume neutralization and constant volume medium exchange processes, maximum reproducability of results is obtained if the entire apparatus is inverted momentarily, at some time midway through the process. Inversion sweeps off the upper surfaces of the tube where there may be droplets of initial solution which have accidently splashed onto the upper walls. The inversion step is recommended only after at least one volume of the new solution has been added, in the case of the constant volume medium exchange process. In the case of a neutralization type process, an inversion step may be interposed at any time.

The apparatus and methods of its operation will next be illustrated by specific examples.

EXAMPLE I

A constant volume neutralization is illustrated herein. A 25% solution of human serum in 0.85% (w/v) NaCl was mixed with an equal volume of 1.2 M perchloric acid. Most, but not all of the serum proteins were precipitated. The protein precipitate was removed by centrifugation. The resulting solution had pH approximately 0.2 due to the presence of 0.6 M perchloric acid. The entire mixture was transferred to an apparatus essentially as depicted in FIG. 1, having a dip-coated filter as described in copending application Ser. No. 846,330.

It was desired to raise the pH of the solution from pH 0.2 to pH 6.3±0.2. The neutralizing solution was a phosphate buffer at pH 6.3 composed of 0.300 M $NaH_2PO_4$ and 0.169 M $Na_2HPO_4$. The apparatus was assembled as depicted in FIG. 1, care being taken to align the immersible filter with the stopper such that the filter did not touch the tube wall at any point when the apparatus was fully assembled. The apparatus inlet was connected to a reservoir of the phosphate buffer at atmospheric pressure. The outlet, connected to the interior of the filter cartridge, was connected to a vacuum source to provide an average flow rate of 0.905 ml/min for a variety of filter units tested. Neutralization was complete after the exchange of at least one volume, 5 ml, of the buffer.

Because of variations in flow rate from one filter unit to another, a standard protocol was devised whereby a plurality of samples could be run for a sufficient time, 30 minutes, to assure the exchange of at least one volume even with the lowest flow rate filter. Using this protocol, a plurality of samples could be neutralized at one time with confidence of achieving a uniform result. At the end of each 30 minute exchange period, the apparatus was disconnected from the vacuum and from the buffer reservoir and inverted once to neutralize any droplets of acid adhering to the upper walls of the tube. The final pH was then measured. In a series of 49 tests, the desired pH of 6.3±0.2 was achieved in all 49 cases.

EXAMPLE II

The following exemplifies the constant volume medium exchange process. A protein containing solution, prepared and neutralized as described in Example I, was placed in the apparatus depicted in FIG. 1. In this process it was desired to replace the phosphate buffer solution having a conductivity of at least 25,000 $\mu$mho with a low salt, 0.01 M ammonium acetate solution having a pH of 6.5±0.05 and a conductivity 900–1000 $\mu$mho. The apparatus was connected to vacuum and to solvent reservoir as described in Example I except that the reservoir in this instance contained the ammonium acetate solution. The ammonium acetate solution was introduced into the apparatus until at least fifteen volumes had passed through. Conveniently, the process was carried out for 75 minutes, based on the results of the previous analysis of flow rate distribution from filter to filter. At approximately the half way time in the exchange process, the tubes were inverted once in order to remove any localized concentration of the original phosphate buffer and to wash down any droplets of buffer adhering to upper walls of the test tube.

Out of 49 samples treated according to the above described process, the final pH of 6.5±0.2 was achieved in all 49 cases. A final conductivity less than 1150 μmho was achieved in 39 of the 49 cases. If the conductivity of the ammonium acetate was 1000 μmho, an additional conductivity increment of 150 μmho could be attributed to the presence of a maximum of 0.6% of the original phosphate buffer. Therefore the exchange was at least 99.4% complete. For comparison with a dialysis procedure, an exhaustive dialysis of the sample against 15 volumes of ammonium acetate would result in 6.6% of the phosphate buffer retained, an order of magnitude more than was obtained by the process of the present invention. Alternatively, the results obtained in the 39 cases would be the equivalent of 7-8 successive equilibrium dialyses against equal volumes of ammonium acetate. Such a laborious procedure could take days to complete, compared to 75 minutes with the process of the present invention.

EXAMPLE III

The following demonstrates the significance of maintaining a separation between the solvents in a constant volume solvent exchange process. An apparatus substantially similar to that depicted in FIG. 1 was loaded with a salt solution having a conductivity of 4150 μmho. The replacement solvent was Milli-Q water (TM Millipore Corp., Bedford, Mass.) having a conductivity less than 0.2 μmho. Samples were run according to the method of the present invention, without agitation, and compared with samples agitated by a large eccentric rotary agitator operated at 100 rpm or 400 rpm. After two volumes of replacement solvent were introduced, the conductivity of the solution in the tube was measured. The results are shown in the accompanying table.

TABLE

| Starting | Conductivities (μmho) | | | |
|---|---|---|---|---|
| | 0 rpm | 100 rpm | 400 rpm | Theory ($e^{-2} \times 4150$) |
| 4150 | 210 | | | |
| 4150 | 150 | | | |
| 4150 | 180 | | | |
| 4150 | 120 | | | |
| 4150 | | 375 | | |
| 4150 | | 330 | | |
| 4150 | | | 450 | |
| 4150 | | | 540 | |
| | Ave 165 | Ave 353 | Ave 495 | 562 |

These results clearly indicate that greater replacement efficiency (lower conductivity) was obtained in the absence of agitation. The efficiency of the process of the present invention is further highlighted by the fact that an exchange of two volumes resulted in retention of approximately 4% of the original salt solution, an amount less than ⅛ that predicted for the theoretical case where instantaneous perfect mixing occurs after the introduction of each volume increment of water.

GENERAL CONCLUDING REMARKS

The apparatus of the present invention is suited to a variety of procedures for varying the composition and physical properties of a solution or suspension of macromolecules, while maintaining a constant volume. Applications include the exchange of one medium for another and specific additions designed to produce a desired change in physical properties. Using the described apparatus and process, the foregoing general procedures can be carried out more conveniently and rapidly than has heretofore been possible with prior art techniques.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains or which would be readily apparent to those skilled in said art. With that understanding, the invention is not to be limited except to the extent required by the appended claims.

What is claimed is:

1. An apparatus for constant volume solvent exchange and constant volume neutralization of a liquid solution or suspension of macromolecules, comprising an upright cylindrical container for the liquid, having a rounded lower end and upper end, inlet means and outlet means in the upper end, an immersible semipermeable membrane filter means having a rigid, porous core and a semi-permeable membrane filter covering the core and separating the core from the container so that any liquid in the container must pass through the semi-permeable membrane filter to enter the core, the semi-permeable membrane filter means having a shape essentially congruent with that of the container lower end and inserted therein essentially co-axially, creating a filtration zone and a bulk zone of any liquid in the container, the filtration zone occupying the lower end of the container, the bulk zone overlying the filtration zone so as to be proximal to the inlet means, the filtration zone providing a space between the semi-permeable membrane filter means and the container, whereby any liquid in the filtration zone occupies a thin layer in the space between the filter and the container, the filter means having a tube communicating with the porous core and connected to the outlet means thereby providing an outlet passageway for any liquid passing through the semi-permeable membrane filter into the core, the inlet means providing a passageway for entry of liquid into the bulk zone of the container and adapted to enhance the radial dispersion of any liquid entering the bulk zone to replace any liquid removed through the outlet, from the filtration zone, the rate of liquid entry being adjustable to equal the rate of liquid removal, thereby exchanging the solvent or neutralizing the liquid solution or suspension of macromolecule while maintaining an essentially constant volume.

2. An apparatus according to claim 1 wherein the container is a test tube and the semi-permeable filter means is a unitary structure having an essentially cylindrical, elongate, rigid porous core, a cap seated on one end of said core and having means including a bore in communication with the porous core and with said container outlet means, and a semipermeable filter membrane secured over the surface of the core and about at least a portion of the cap and securing the cap to the core, the end of the core opposite the cap being rounded to confer a shape essentially congruent with that of the test tube.

3. An apparatus according to claim 1 wherein the liquid layer in the filtration zone has a thickness of 1 mm to 3 mm.

4. An apparatus according to claim 1 wherein the semi-permeable membrane filter nominally excludes macromolecules of molecular weight greater than 10,000.

5. A method for treating a liquid solution or suspension of macromolecules in a first liquid medium whereby the first liquid medium is removed through a semi-permeable membrane filter, while simultaneously a second liquid medium is added directly to the first liquid medium, said method comprising the steps of:
   (a) establishing and maintaining an overlying bulk zone, and an underlying filtration zone, both said zones being adjacent the same surface of the semi-permeable membrane filter in which the liquid being processed is maintained in a thin film adjacent the membrane surface,
   (b) removing the first liquid medium from the filtration zone, by passing the liquid medium through the semi-permeable membrane filter, and
   (c) substantially simultaneously adding an equivalent amount of the second liquid medium to the bulk zone.

6. A method according to claim 5 wherein the steps of removing the first liquid medium and adding the second liquid medium are conducted at substantially the same rate.

7. A method according to claim 5 wherein the second liquid medium is less dense than the first liquid medium and step (c) is modified to include maintaining the first liquid medium and the second liquid medium substantially unmixed, whereby the added second liquid medium forms a layer overlying the first liquid medium.

8. A method according to claim 5 wherein step (c) is modified to provide that adding the second liquid medium produces rapid radial dispersion of the second medium in the container.

9. A method according to claim 5 wherein the semi-permeable membrane filter nominally excludes macromolecules having a molecular weight greater than 10,000.

10. A method for treating a liquid composed of macromolecules in a first liquid medium by exchanging the first liquid medium for a second liquid medium while maintaining the liquid volume essentially constant, comprising the steps of:
    (a) providing that the first liquid medium be more dense than the second liquid medium,
    (b) placing the liquid composed of macromolecules in the first liquid medium into a container having a semi-permeable membrane filter dividing the liquid in the container into a bulk zone and a filtration zone on one side of said membrane, the liquid in the filtration zone being constrained to occupy a thin layer contacting the semi-permeable membrane filter, the bulk zone situated above the filtration zone,
    (c) removing the first liquid medium from the filtration zone and from the container, through the semi-permeable membrane filter, thereby retaining the macromolecules in the container,
    (d) simultaneously adding the second liquid medium to the bulk zone at substantially the same rate as the first liquid medium is removed, and
    (e) maintaining the first liquid medium and the second liquid medium substantially unmixed, thereby producing a layer of second liquid medium on top of the first liquid medium, thereby exchanging the first liquid medium with the second liquid medium while maintaining the volume of liquid essentially constant.

11. A method according to claim 10 wherein the semi-permeable membrane filter nominally excludes macromolecules having a molecular weight greater than 10,000.

12. A method according to claim 10 wherein the first liquid medium comprises a phosphate buffer solution having a conductivity of at least 25,000 $\mu$mho, the second medium comprises a 0.01 M ammonium acetate having a conductivity in the range 900–1000 $\mu$mho and the treatment results in at least 99% exchange of the first liquid medium by the second liquid medium.

13. A method for treating a liquid composed of macromolecules in a first liquid medium, in order to produce a desired property of the liquid while maintaining an essentially constant volume, comprising the steps of:
    (a) placing the liquid in a container having a semi-permeable membrane filter, dividing the liquid therein into a bulk zone and a filtration zone on the same side of said membrane, the liquid in the filtration zone being constrained to occupy a thin layer contacting the semi-permeable membrane filter, the bulk zone situated above the filtration zone,
    (b) adding a second liquid medium, capable of producing the desired change in a property of the liquid, to the bulk zone,
    (c) simultaneously with step (b), removing liquid medium in the filtration zone from the container through the semi-permeable membrane filter, the rate of removal being essentially similar to the rate of second liquid medium addition thereby maintaining an essentially constant volume of liquid, and
    (d) continuing steps (b) and (c) until a desired property has been produced in the liquid of the container.

14. A method according to claim 13 wherein the semi-permeable membrane filter nominally excludes macromolecules having a molecular weight greater than 10,000.

15. A method according to claim 13 wherein the desired property is a pH value.

16. A method according to claim 13 wherein the first liquid medium comprises 0.6 M unbuffered perchloric acid, the second liquid medium comprises 0.3 M $NaH_2PO_4$ and 0.169 M $Na_2HPO_4$ at pH 6.3, and the desired property is a pH value of 6.3.

* * * * *